US008914024B2

(12) United States Patent
Alharayeri

(10) Patent No.: US 8,914,024 B2
(45) Date of Patent: Dec. 16, 2014

(54) DISCOVERY OF NETWORK MEMBERS BY PERSONAL ATTRIBUTES

(75) Inventor: Ramzi Alharayeri, Los Gatos, CA (US)

(73) Assignee: Ximoxi, Inc., Los Gatos, CA (US)

( * ) Notice: Subject to any disclaimer, the term of this patent is extended or adjusted under 35 U.S.C. 154(b) by 1274 days.

(21) Appl. No.: 12/351,654

(22) Filed: Jan. 9, 2009

(65) Prior Publication Data

US 2009/0181653 A1 Jul. 16, 2009

Related U.S. Application Data

(60) Provisional application No. 61/010,891, filed on Jan. 10, 2008.

(51) Int. Cl.
*H04W 4/00* (2009.01)
*H04L 29/08* (2006.01)
*H04W 4/02* (2009.01)

(52) U.S. Cl.
CPC .......... *H04L 67/16* (2013.01); *H04L 67/04* (2013.01); *H04W 4/02* (2013.01); *H04L 67/28* (2013.01); *H04L 67/306* (2013.01); *H04L 67/18* (2013.01)
USPC ............... 455/434; 455/414.1; 455/426.1; 455/432.3; 455/456.3; 370/310.2; 370/319; 370/320; 370/321; 370/338

(58) Field of Classification Search
USPC .......... 455/41.2, 412.2, 414.1, 426.1, 432.3, 455/434, 456.3; 370/310.2, 319–321, 338
See application file for complete search history.

(56) References Cited

U.S. PATENT DOCUMENTS

| | | | |
|---|---|---|---|
| 6,178,511 B1 | 1/2001 | Cohen et al. | |
| 6,243,816 B1 | 6/2001 | Fang et al. | |
| 7,249,182 B1 | 7/2007 | Heinonen et al. | |
| 7,296,036 B2 | 11/2007 | Celik | |
| 7,310,515 B2 | 12/2007 | Enderlein et al. | |
| 7,346,855 B2 | 3/2008 | Hellyar et al. | |
| 7,353,462 B2 | 4/2008 | Caffarelli | |
| 2004/0009750 A1 | 1/2004 | Beros et al. | |
| 2004/0113807 A1 | 6/2004 | Amram et al. | |
| 2005/0026594 A1* | 2/2005 | Miller et al. | 455/410 |
| 2005/0076124 A1 | 4/2005 | Enderlein et al. | |
| 2005/0281237 A1 | 12/2005 | Heinonen et al. | |
| 2006/0063548 A1* | 3/2006 | Kim | 455/518 |

(Continued)

FOREIGN PATENT DOCUMENTS

DE 101 49 496 4/2003
EP 1 450 282 8/2004

OTHER PUBLICATIONS

International Search Report for PCT/US2009/030756, mailed May 19, 2009, 12 pgs.

(Continued)

*Primary Examiner* — Ajit Patel
*Assistant Examiner* — Matthew Genack
(74) *Attorney, Agent, or Firm* — Nixon Peabody LLP; Khaled Shami

(57) ABSTRACT

A method and application for mobile phone users provides an ability to discover personal attributes including photo of other individuals in vicinity covered by a short range wireless network, such as Bluetooth or similar signals operating in a wireless free spectrum, such as WiFi. The users can elect to exchange, send or receive contact information with ones that are in the vicinity that includes photos.

31 Claims, 8 Drawing Sheets

(56) References Cited

U.S. PATENT DOCUMENTS

| | | |
|---|---|---|
| 2006/0234631 A1 | 10/2006 | Dieguez |
| 2007/0021111 A1 | 1/2007 | Celik |
| 2007/0167136 A1 | 7/2007 | Groth |
| 2007/0168425 A1* | 7/2007 | Morotomi ............... 709/204 |
| 2007/0242814 A1* | 10/2007 | Gober ............... 379/101.01 |
| 2007/0260751 A1 | 11/2007 | Meesseman |
| 2008/0051033 A1 | 2/2008 | Hymes |
| 2009/0209202 A1* | 8/2009 | Martini et al. ............... 455/41.2 |

OTHER PUBLICATIONS

Malley "Apple seeks distance-based pairing, auto contact data patents", article, downloaded from www.appleinsider.com/articles/08/09/27/apple, on Sep. 6, 2009, 2 pgs.

* cited by examiner

DISCOVERY OF NETWORK MEMBERS BY PERSONAL ATTRIBUTES

RELATED APPLICATIONS

This application claims the benefit to U.S. Provisional Application No. 61/010,891 filed on Jan. 10, 2008, the contents of which are incorporated by reference herein in its entirety.

FIELD OF INVENTION

The invention relates to exchanging information using mobile communication devices and, in particular, exchanging personal information between one or more mobile communication devices.

DESCRIPTION OF RELATED ART

In light of the explosive use of mobile devices, social networks and email addresses, individuals are in need of the ability to exchange customized information such as pictures, social network profiles, emails and phone numbers using their mobile devices.

There are methods to exchange contact information in the form of Vcards. But there is no form of communication using mobile devices that allows discovery by personal attributes for the purpose of exchanging contact information. Furthermore, there is no available technology adapted for allowing mobile device users to easily exchange contact and/or related personal information over the internet for the purpose of social interaction by way of mobile devices.

Some available methods for contact information exchange do not provide discovery by attributes. Rather, these methods assign pin numbers to individuals or offer discovery by a mobile class or mobile ID. Typically, these systems require a user to operate under a common telecommunication service provider operated network. Other methods are based on Bluetooth technology in an ad hoc mode between two devices. These methods usually work only on same brand mobile devices due to Bluetooth technology limitations, compatibility and security issues.

Communication between two Bluetooth-enabled devices typically requires entering a passkey or security code to allow pairing or communication between any two devices. This desire for maintaining security/privacy, inherent in the design of existing Bluetooth-enabled devices, such as a Smartphone, has imposed undesirable limitations on mobile device users who wish to interact with each other in a social setting.

Other alternatives available for contact information exchange such as Beam technology permit the exchange to take place between similar mobile devices using an infrared signal. This particular solution is, however, limited. For example, it requires a line-of-sight between the devices and does not offer the ability to exchange information such as pictures as a personal attribute and limits the use to a similar brand of hardware transmitting in an ad hoc mode.

U.S. Pat. Nos. 7,454,004; 7,450,966; 6,868,451; 7,440,746; and 7,249,182 focus on contact information storage, retrieval, Bluetooth methods of profiles and exchange of contact information in an ad hoc method.

SUMMARY OF THE INVENTION

The invention is directed to a system and method that allows individuals to use their mobile phones to discover others by personal attributes, such as by photos and names, after which, the two parties can exchange information over the internet by bypassing the inherent limitations of existing Bluetooth technology, e.g., security/privacy limitations and compatibility issues that limit or prohibit ad hoc communication, such as when mobile devices of different brands attempt to communicate with each other. In another sense, where there is interference making it difficult to communicate via Bluetooth, WiFi, etc. there is a system disclosed that provides an alternative pathway, network, communication link, etc. available through a cellular phone network, Ethernet or similar wired connection that is available in the event the local ad hoc network becomes unavailable after initial discovery of an address or other unique identifier for a mobile device.

In one aspect, the invention provides a system and method that enables free discovery of others who also desire social interaction, but without being constrained by hardware compatibility issues inherent in mobile devices by different manufacturers. According to this aspect of the invention, mobile device users (or users) can offer to other, nearby users, their pictures as part of a discovery process, save contacts received from other users, and keep contacts stored on a mobile device up to date by upload/download of personal information through a networked storage device, e.g., an internet-linked storage device accessible through a cellular phone network. The storage device can be configured to frequently push updates of a user's contacts to his/her mobile device. Additionally, the network link with the storage device may be configured to initiate an exchange of photos and other contact information (via access to the network storage) after initial discovery has occurred between users over a Bluetooth-enabled communication link, such as a Bluetooth user's Personal Area Network (PAN).

According to the invention, a process of discovery and exchange of contact information may provide the mobile device user (or users) with an experience of exchanging highly personal information with someone nearby, after that person has been discovered using existing standard Bluetooth technology, but without the need to reprogram or adapt a standard cell phone to permit exchanges of personal information over, e.g., a PAN, such as pictures or a VCard level of personal information. Thus, the invention offers the advantage of not being limited to similar mobile devices, and capable of being implemented on almost any type of mobile communication device, e.g., a standard cell phone, since the personal information exchange does not occur via direct communication between the mobile devices, although the user has this type of experience when socializing since there can be a nearly real time exchange of personal information with someone whom he/she has just discovered over a PAN, or a WiFi network, for example.

It should be noted that while the invention is preferably implemented for using a Bluetooth-type PAN (Personal Area Network), it will be understood that the invention is not limited to Bluetooth, such as the Bluetooth Specification V 2.1+EDR (Enhanced Data Rate).

For purposes of explanation, the following definitions are adopted. A "requesting user" is the person or person(s) who, using a Bluetooth-enabled mobile device, initiate a discovery process, e.g., search for other Bluetooth-enabled devices within a PAN, and a "discovered user" is the person or person(s) having a Bluetooth enabled device that are discovered by the requesting user.

In one example, two persons, a requesting user and discovered or discoverable user are members of a social network that allows the members to communicate with each other over the internet. The network includes a server that stores personal attribute information. A standard Bluetooth discovery process may be initiated by the requesting user. The discoverable user member is discovered, e.g., when the requesting user's mobile device receives a Bluetooth address. Then this address is communicated to the server, and in response the server sends a picture and name of the discoverable user to the requesting user. The requesting user's next requests that the server transmit his/her customized invitation or electronic card to the now discovered user. The communication between requesting/discovered users may then proceed by accessing information located over network storage, thereby bypassing the limitations of communication using the Bluetooth protocol. The Bluetooth protocol, in this example, is used to locate someone nearby. But after this discovery, the requesting and discovered users thereafter communicate over the internet. The subsequent interaction may include an exchange of VCards or similar electronic coordinates, SMS or other forms of real-time communication that may be facilitated by the same service that connected the two user's to each other, or by a third party service.

According to another aspect of the invention, there is a system and method that allows users of a social network, or more generally database service to create custom social cards that include social profiles, emails, phone numbers and/or a picture as a personal attribute. In one embodiment, a custom social card associated with the discovered user may be received when a requesting user discovers another member of the service, rather than an uninteresting Bluetooth address or serial number. For instance, the social card may include a picture and a name, personalized icons or card designs, etc. Furthermore, the requesting user may collect a plurality of such social cards when there are many members of the service within the short range network. The social cards are received from the server in response to the requesting user's mobile device uploading mobile device attributes associated with other members of the social network, group or service. If the requesting user elects to make contact with one or more of the members, he/she may send an invitation containing a picture of the requesting user with a personalized message intended to spark an interest in the discovered user. The discovered user may then respond by sending his/her own custom social card, or reject the invitation.

The system includes a network-linked storage facility that collects information provided by members of a group, e.g., members of a social network, along with personal attributes in a data base hosted by a centralized computer with internet connection. The system associates a member's, e.g., phone ID to the member's account/profile. The phone association takes place when the user downloads a client-side application which collects, among other things, a unique phone characteristic such as a Bluetooth address or serial number.

In accordance with one or more of the foregoing objectives, the invention may be implemented to allow mobile device users to discover other members of the same database service, e.g., a social network, within a vicinity covered by short range wireless networks such as Bluetooth but without being limited by the shortcomings of the Bluetooth or related short range telecommunication standards and/or related hardware incompatibilities. The members can elect to exchange or send personalized, intimate contact information over the internet after the user's have discovered each other, thereby bypassing short range security/privacy barriers and/or hardware compatibilities between mobile communication devices from different manufacturers. Hence, the invention enhances and facilitates the sharing of contact information between mobile users. The invention leverages available technology and standard protocols available today such as Bluetooth technology and defined standards within the Bluetooth technology such as Vcard profile and OBEX.

As mentioned earlier, all of the presently known, existing technology for communicating over short range, e.g., infrared or Bluetooth, focus on pushing contact information from one device to another. According to another aspect of the invention, there is a bi directional exchange of contact information allowing receiving and sending at the same time. There is no slave/master relationship, which is common to all current existing contact exchange technologies between mobile devices.

The invention fills a gap left by the existing standards and technologies when it comes to the actual discovery process and exchange of contact information over the internet by bypassing ad hoc communication and compatibility issues.

According to another embodiment a system for exchanging personal information between a first user and second user, includes a server accessible through the internet, the server providing access to stored user profile information about the first and second users including personal attribute information and mobile device addresses; searching, using a first device, for the presence of other mobile devices within the vicinity of the first device using the short range communication protocol, whereupon discovery of a second device the first device receives a unique, identifying attribute of the second device the first mobile device sending from the first device to the server the received identifying attribute for the second device; the server sending to the second device, via the server, an invitation to accept personal information from, or share personal information with the first user, wherein the invitation includes a graphics file associated with the first user's personal attribute information; and the second mobile device accepting or rejecting using the second device the invitation from the first device.

According to yet another embodiment a method for requesting an exchange of personal information using a mobile communication device comprises the steps of: searching for the presence of other mobile devices within a personal area network; receiving a mobile device attribute from one or more nearby mobile devices; and sending one or more of the received mobile device attributes to a server located on the internet, the server being responsive to receipt of the one or more mobile device attributes for transmitting personal information about a respective one or more persons associated with the mobile device attributes received by the server.

According to yet another embodiment, a system for exchanging information among members of a group, such as members of a social network service, includes an internet-based server having a registration portion. After a user has registered online with the service, the server downloads a client-side application to the mobile device. A registration process is complete when a user receives a copy of a customized social card. And the user may thereafter transmit his/her social card to devices identified over a local network, such as a PAN, when those devices are also members of the group According to another aspect of the invention, there is a method for meeting people including discovering people, e.g., over an ad hoc network, personal area network, etc., viewing their pictures, names, or other personal information, and selecting one or more people to send an invitation. The invitation may take the form of a social card, VCard, or other manner of engaging another person in a social atmosphere, or even a business setting such as a meeting, trade show, conference, etc.

According to another aspect of the invention, there is a method for discovering a person over a first network, and then communicating with that person over a second network after obtaining an electronic coordinate, e.g., a Bluetooth ID address, of the person. The first network can be a Personal Area Network (PAN) and the second network can be a cellular phone network. The method may further include the step of selecting and exchanging information based on pictures received at each of two or more mobile devices based on a mobile phone ID indexing/cross reference at a network server. The mobile device users can be members of a service that operates/maintains the server. The method may further include contacting each mobile user by a message that is presented to the user by a picture displayed on, and selectable by a mobile phone, the picture being sent by a server responsive to a received mobile phone ID or Bluetooth address.

According to another embodiment, a server is capable of providing a communication between a first and second mobile phone user based on receipt of mobile phone identifier, the server communicating via a cellular phone network and the mobile device identifiers being discovered over a PAN or similar local ad hoc network. The server is capable of providing information to phones not capable of exchanging data via Bluetooth or the related ad hoc network communication protocol, and/or not connected to a cellular phone network via a common cellular phone network provider, or provider plan.

According to another aspect of the invention, there is a method for discovering a person over a first, one-directional network, and then communicating with that person over a second, bi-directional network after obtaining an electronic coordinate, e.g., a Bluetooth ID address, of the person. The first network can be a Personal Area Network (PAN) and the second network can be a cellular phone network. The one directional network can conduct the discovery utilizing a communication medium having a master-slave relationship, as understood in the art, while the second network can operate by utilizing a network based storage for receiving and responding to requests to send or receive information form each side of the communication, e.g. bi-directional communication between a first and second mobile device.

INCORPORATION BY REFERENCE

All publications, patent applications or patents mentioned in this specification are herein incorporated by reference to the same extent as if each individual publication or patent application was specifically and individually indicated to be incorporated by reference.

DETAIL DESCRIPTION OF EMBODIMENTS

According to one aspect of the disclosure, mobile device users sign up, or register with a service that enables the exchange of personal information through a network-based server. After the user provides mobile device information and a phone number, an internet-based centralized computer system (hereinafter "Server") sends to the mobile device a notification via SMS (Short Messaging Service). The SMS message, also known as a text message, alerts the new user to click on an internet link to install the service provider's client-side application on his/her mobile device.

Figure 1:
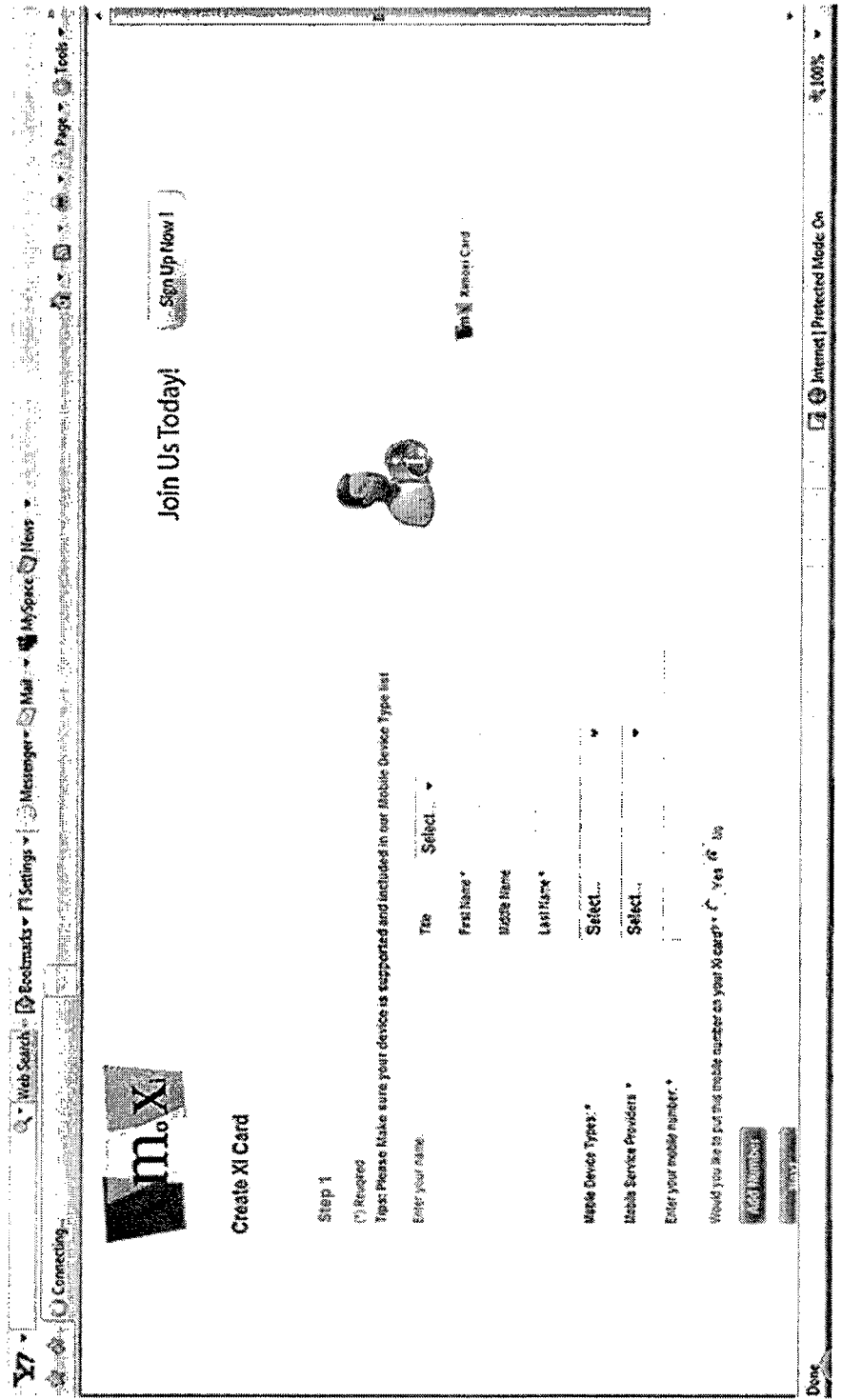
FIG. 1 depicts a computer generated display for registering with a service. This service may provide a user with a network-based storage for personal contact information, creation of a custom social card to send to discovered, or requesting users who are also members of the service, to provide personal contact information to other users and for accessing personal contact information of other users of the service. The service may be part of a social network.

The user provides information by filling out an on-line profile, including uploading graphics or pictures. An example of a computer generated sign-up screen is shown in FIG. 1. Additional aspects of the registration process include creating a social card, which is intended to be sent to discovered users whom the user wishes to communicate, and/or to a requesting user upon being discovered, e.g., via a Bluetooth communication protocol.

As mentioned above, the registration process also includes download of the client-side application (CSA); it resides on the mobile device, is enabled to communicate directly with the service, e.g., to synchronize/update addresses, access account information via username/password, or phone ID, send requests for information about users, send invitations, accept, exchange deny requests for exchange of information, obtain instances of the server addresses, etc. The registration process may be completed when the mobile device receives the customized social card through the resident CSA. Additional aspects of the possible functionalities of this client side application and provided below.

Figure 4:
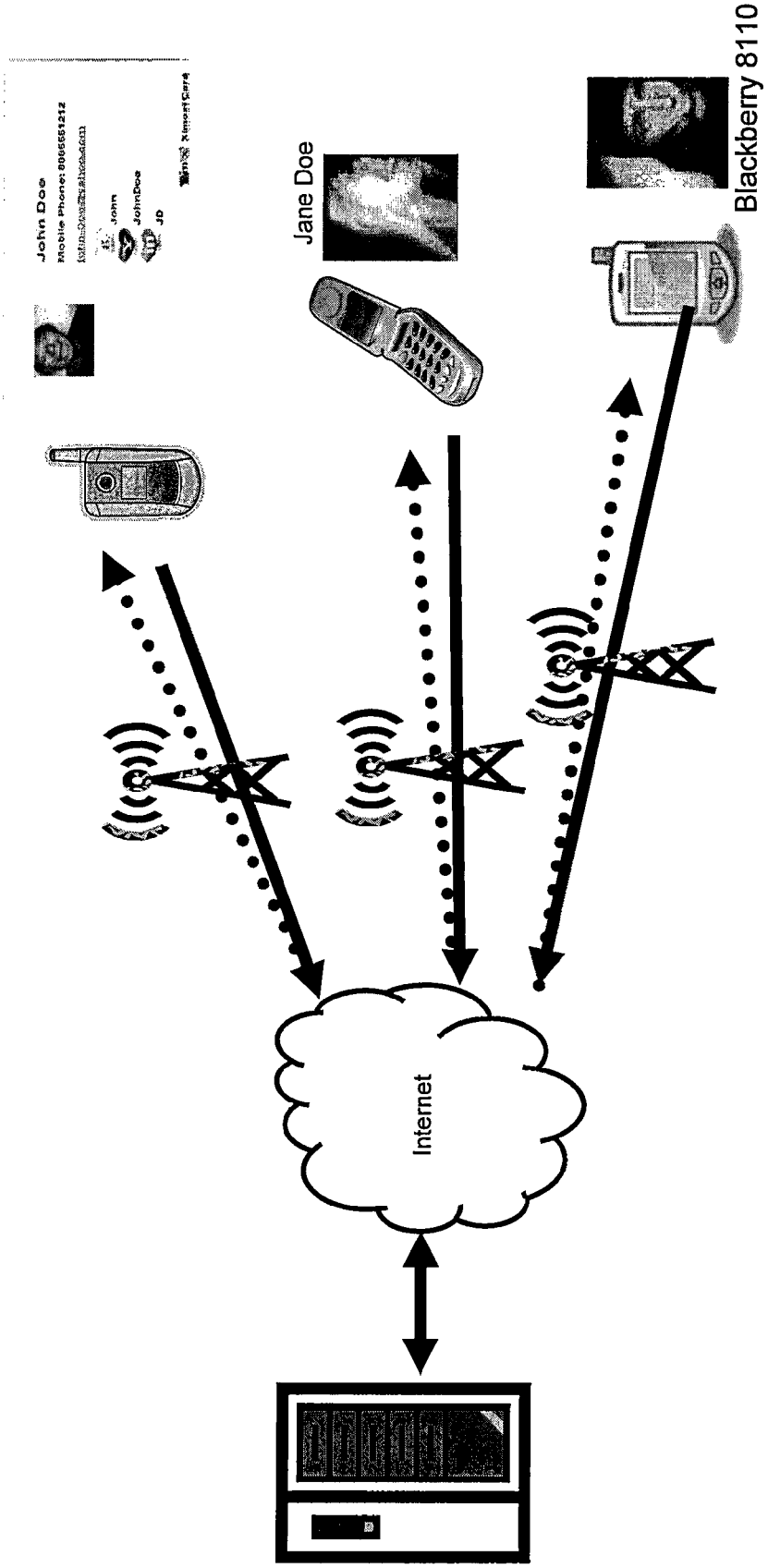
FIG. 4 depicts communication links to/from mobile devices and a network-based server, e.g., internet server, over a Cellular Base Transceiver Station (BTS) using standard communication protocols that provide separate facilities for transmission of digital data. As depicted, the mobile devices may communicate by sending pictures of users associated with the device during a discovery process, as facilitated by the server.

Preferably, in order to take advantage of the functionalities provided by the service, the member of the service ("member") should have a mobile communication device that provides separate facilities (besides voice transmission) for transmitting digital data. This allows a mobile phone to act like any other computer over the Internet, sending and receiving data via the Internet Protocol. FIG. 4 illustrates how communication between mobile users and the Server is conducted. All Communication between the member's mobile devices and the server goes through a Cellular Base Transceiver Station (BTS), and communicates according to a packet-based telecommunications protocol such as GPRS, 3G or any alternative data technology.

Hereinafter the short range communication network used in the examples will primarily be described in terms of the Bluetooth standard. However, it should be remembered that other forms of short-range communication may instead be used, e.g., WiFi.

Figure 2:
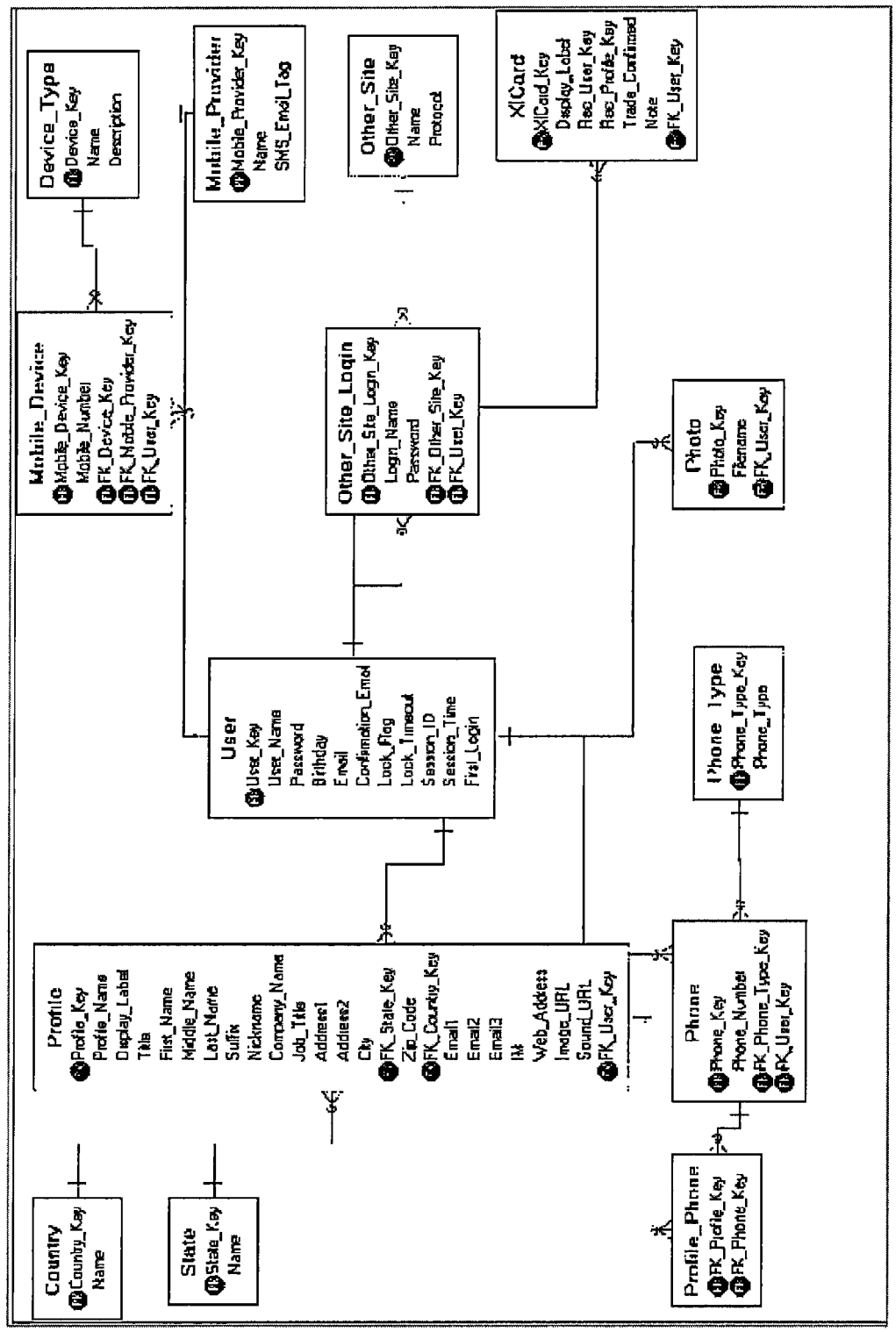
FIG. 2 depicts a database schema/structure for maintaining personal information about a user (member) registered with the service. The information about the member may include, for example, his/her mobile device attributes such as the device key, mobile telecommunications provider; the mobile device type; the member's profile, e.g., name, address, etc.; stored photo(s) of the user; country/state where the member resides; and other information.

One format for storing information about a user/member of the service is shown in FIG. 2. Depicted herein are some of the types of user information that may be stored and made accessible to the user at the server. Users may provide personal attributes such as name, address, and a picture. Information about the user's mobile device may include the make, model, and phone number.

The service provided to users may be operated/accessible under a centralized computer system ("server"), which may include three components: 1) Graphical user interface, providing an interface to members of the network to sign up, input/edit profile information, etc. 2) A scripting language designed for producing dynamic web pages such as PHP. This is a middle layer scripting that manages programming commands. 3) A comprehensive data base that includes user's information, such as that shown in FIG. 2.

Figure 3:
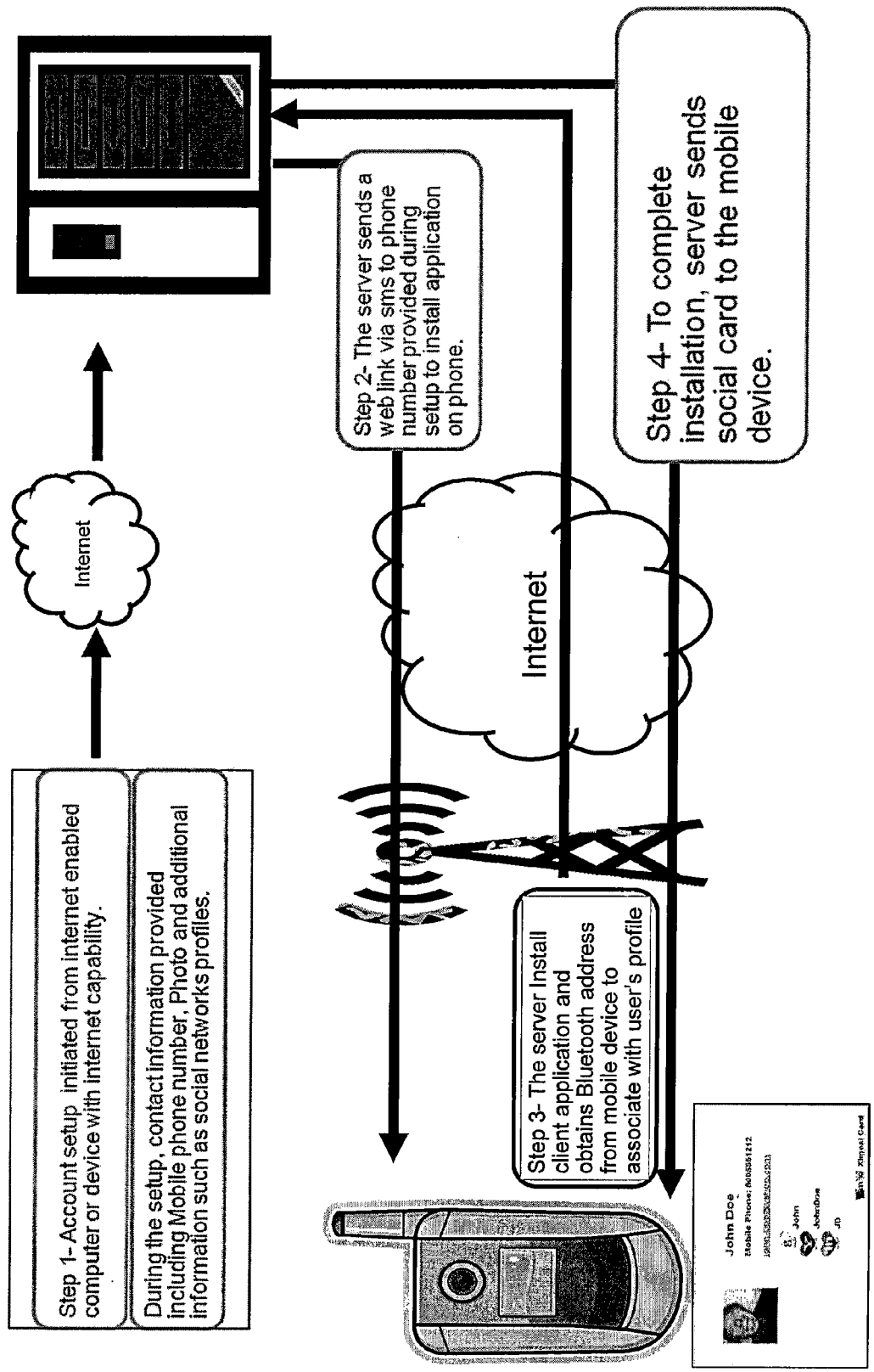
FIG. 3 is a flow chart associated with the creation of a social card for sending to requesting and/or discovered users.
Figure 5:
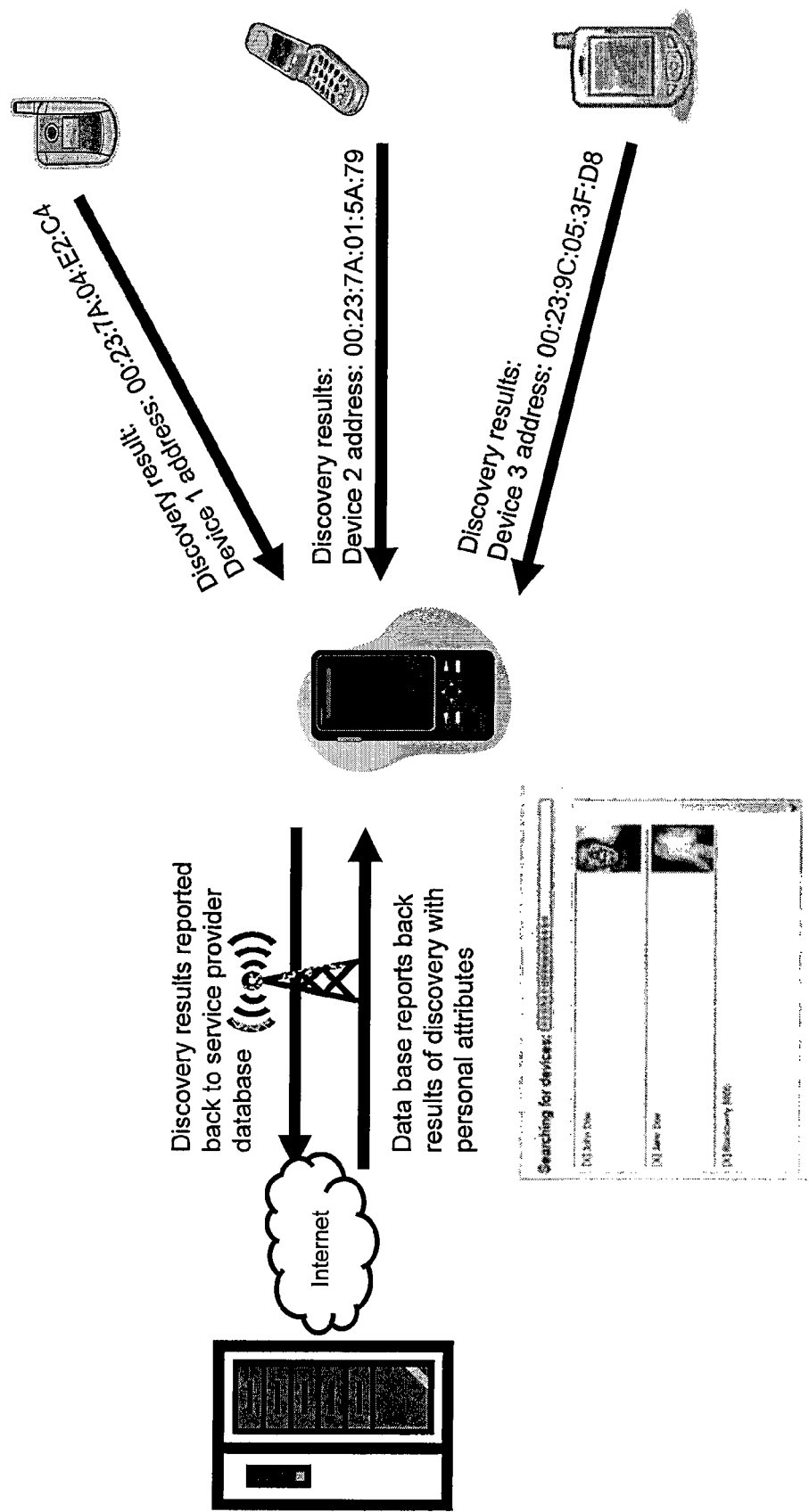
FIG. 5 illustrates a discovery process flow chart between a requesting user and three discovered users.

FIG. 3 is a flow chart depicting a process for registering with the service:

Step one: Account set up and information provided through a web-based User Interface, e.g., such as shown in FIG. 1;

Step 2: The Server sends an SMS with URL link for download of the CAS;

Step 3: The CSA collects characteristics from the mobile device such as a Bluetooth address for the purpose of associating the mobile device with a user account maintained at the Server. This association between a Bluetooth address and information in the associated user's account, e.g., a photo, allows the display of interesting personal information such as a picture (as opposed to simply a Bluetooth address, device type, etc.) among members during discovery, such as depicted in FIG. 5. In this way members can interact with each other in a way intended to facilitate social interaction, without being limited to only the information made available through existing, hardware independent and limited communication ability as adopted under the Bluetooth standard.

Step 4: To complete installation of the CSA, the server provides the mobile device with a copy of the member's social card and account information. Thereafter, the user may update, replace, revise the social card or personal attribute information, modify, hide or publish profile information (at the server) as contained in the user's contact information, e.g., the information contained in the user's Vcard which may be sent when the user accepts, or a discovered user accepts an invitation to exchange contact information.

Some of the other functions that may be included in the CSA are discussed below. As mentioned above, FIG. 5 illustrates how the Server may associate each mobile device with a member account of the service using a Bluetooth device ID address. During the installation process, the Server may send the CSA to the mobile device and also obtain from the mobile device its unique Bluetooth device ID address (BD_ADDR). Every mobile device with Bluetooth capability has a unique 48-bit address. The installed application sends the Bluetooth address to the server and associates the member with this particular mobile device. Example of an obtained BD_ADDR 48-bit would be: 00:23:7A:04:E2:C4.

As known in the art, a Bluetooth-enabled device permits the user to perform an inquiry to find other devices, located within the mobile device's PAN, to be connected to it via the Bluetooth communication standard and configured to respond to inquiries from the requesting user. However, the Bluetooth protocol only provides device name, ID address and/or device class, if requested. Communication between two devices over Bluetooth requires pairing or acceptance by its owner, but the connection itself can be initiated by any device and held until it goes out of range. The initial contact or discovery of another member according to the invention may be established by this standard form of communication. Once contact is made and the Bluetooth device ID address of the discovered user obtained, then personal contact information is received from the network-based service, as explained above, in response to the initial, identifying information about the mobile device.

Referring again to FIG. 5, the Bluetooth standard may be used to accomplish two tasks: First is to obtain a device address. Second, to perform an inquiry utilizing Bluetooth software layers and architecture. After these tasks are complete, all subsequent communications are facilitated through the Server, which may be via a bi-directional method of personal contact information exchange.

As will be understood in light of the disclosure, a bi-directional method for exchange, preferred, is capable of automating the process of data packet transfer and receipt from both devices reducing the time and human involvement required from both parties to cause the aforementioned processes according to the invention to occur. Thus, in one sense a bi-directional mode of communication may enhance the social experience because it gives the users a sense that the invitation, response and a follow-up exchange (if there is interest) is occurring in near real-time (e.g., as if the devices were actually communicating over a PAN). In the Bluetooth spec, the standard requires that one party is a master and the other party is a slave. All data exchange requires a push and/or pull between the master and slave. A bi-directional method identifies both parties as masters and the exchange is managed from both directions as both parties are communicating to a centralized computer system rather than directly. This bi-directional process can allow the users to process multiple requests through the server without waiting for a single process between two devices that can handle only one push or one pull at a time.

It will be appreciated in light of the disclosure that the Bi-directional mode of communication method offers the advantage of facilitating an ongoing exchange between mobile device users. That is, the server can receiver and send information simultaneously to both users, as opposed to a master-slave type relationship developed under the Bluetooth standard. Thus, in one sense this aspect of the invention may be thought of as providing master-master type communication protocol whereby each mobile device can send and receive information independent of the other mobile device. It will be understood that "master" in this sense does not mean or imply that only a Bluetooth protocol is necessarily contemplated.

Unlike communication using Bluetooth, which is limited by security constraints between paired devices (inherent in the Bluetooth standard), and/or related hardware compatibility issues between mobile devices, all of which are greatly limited in the kinds of information that may be exchanged using standard hardware/software platforms on mobile devices, the invention allows a user to essentially bypass these constraints so that a more personal interaction becomes possible using a standard mobile communication device. "Standard communication device" is intended to mean a device such as a cell phone, equipped with a standard Bluetooth capability, e.g. Bluetooth V.2.1+EDR (Enhanced data Rate), and standard communication hardware found on cell phones available for purchase through, e.g., any mobile phone service provider.

It will be readily apparent that the invention provides a medium for near real-time exchange of contact information unlike E-mail, SMS or other modes of communication between mobile devices. In this sense the user experience is enhanced over the exchange of E-mail or texting among phones, in at least three ways. First and most obviously, a requesting device is not limited to conversing with only members that he/she can contact through a known e-mail address, phone number, etc. Second, the exchange may proceed simply by initiating discovery and/or responding to a discovery request. Third, the exchange can occur among multiple members of a service at the same time.

Figure 6:
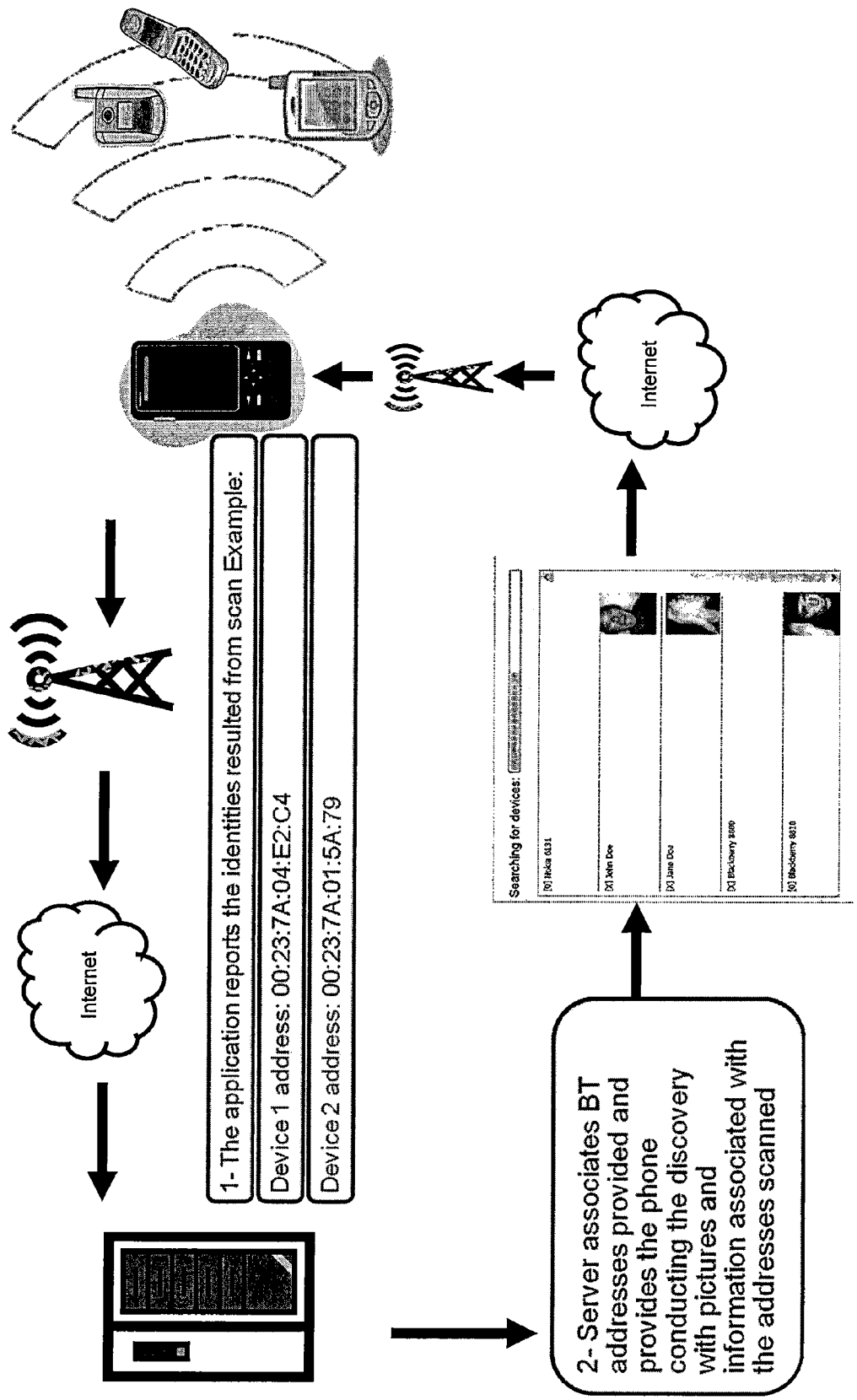
FIG. 6 is a flow chart for a discovery process for associating unique, mobile device identifying attributes, e.g., Bluetooth addresses, with personal attributes between the requesting user and discovered users using information available from the network server. Each mobile device user is a member of the service and has personal contact information accessible through the server.

FIG. 6 illustrates the discovery of the three discovered users from FIG. 5 using the requesting user's mobile device. The requesting user's resident CSA, upon receiving the three respective Bluetooth device ID addresses, i.e., addresses for device 1, device 2 and device 3, sends this information to the network server via the cellular phone network. The server, after matching the discovered members' using the uploaded information, transmits back to the requesting user(s) mobile device a picture and name for each of the discovered devices, which is then displayed on the mobile device's screen. The discovery process may thus include the showing of personal or intimate information that a member may wish to have displayed during the initial discovery step, rather than a device ID or address, device type, etc. At this point the requesting user has received a list of pictures and names which he/she can now select from the mobile device if further contact is desirable.

In one example, in a first step of the discovery process, a user scans the surrounding area covered by Bluetooth short range wireless signal, and obtains all Bluetooth addresses of members in the area. In the second step, the server associates all or some of these Bluetooth addresses with member profiles in the data base (each of which may contain the information described in FIG. 2) and provides the requesting user conducting the discovery with the results of the discovery in the form of personal attributes of nearby members including their pictures and names, which may be a social card for each of the members of the service. If a device address is not associated with a member of the service, the Server will report to the user conducting the discovery that the address as "Unknown" or provide generic information such as the device class or device name per Bluetooth standards.

Figure 7:
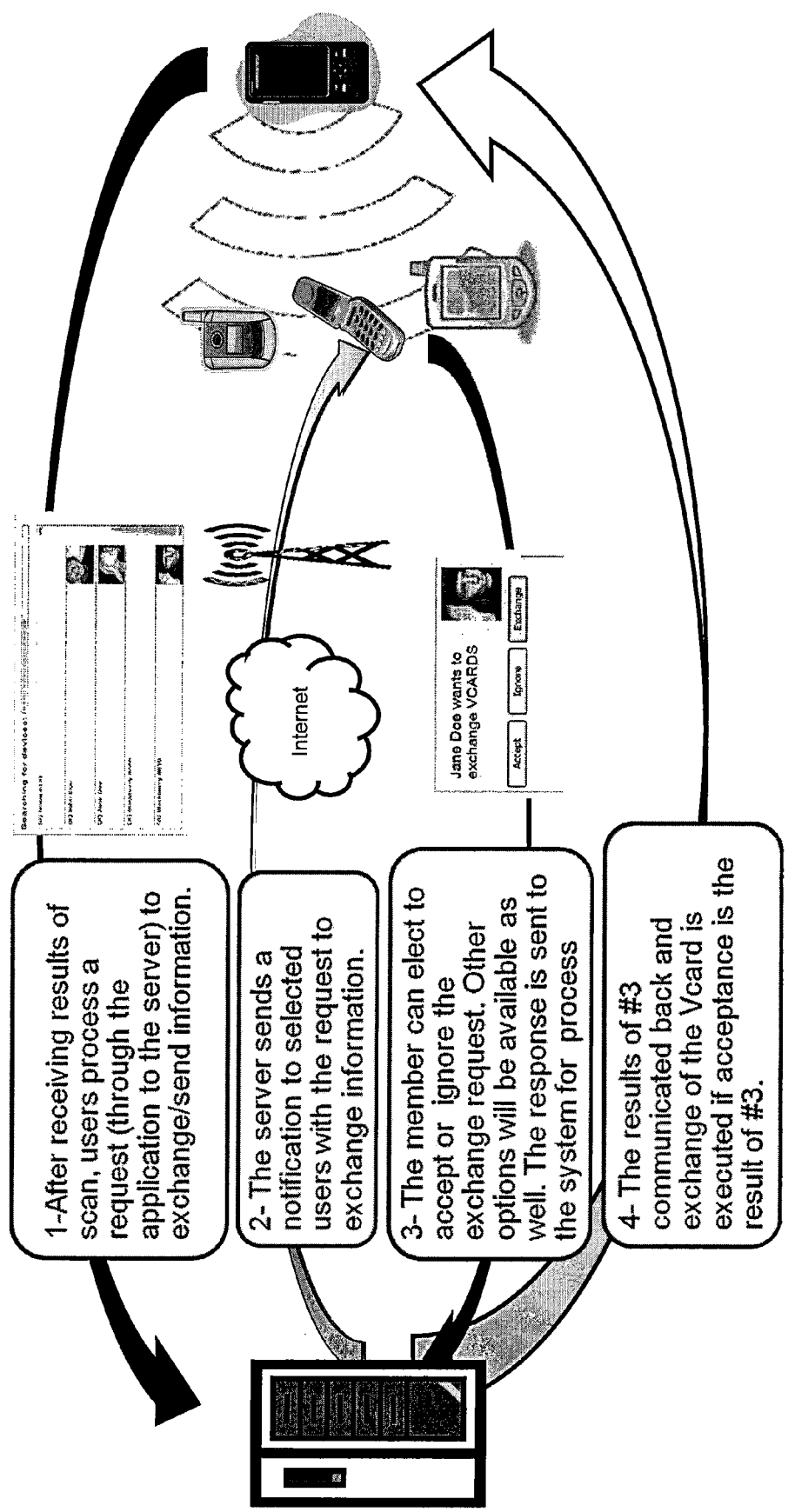
FIG. 7 is a flow chart depicting the processing of the requesting user's request to exchange information with the discovered users. In this example Jane Doe has selected one of the three discovered users after receiving the results of the scan, i.e., pictures and names of everyone within the discovery range, e.g., PAN, of Jan Doe's mobile device.

FIG. 7 shows in further detail how users may discover each other, in four steps:

Step 1: The results of a discovery are provided to the requesting user, who receives personal attributes including pictures and names of four other discovered users. The requesting user (User #1) selects the one or more of the discovered users from the list (using functions available through the CSA) that he wishes to exchange contact information with. This request is received by the CSA, such as through the mobile device's touch-sensitive screen for selecting one or more displayed social cards or icons displaying a discovered user's picture and name (e.g., as shown in the drawings). Once the mobile device user selects one or more discovered users by screen, keypad, mouse, pen, etc., the CSA can then initiate automatic access information to the Server. Form this point, the Server proceeds to distribute the social card to the selected discovered user(s).

Step 2: The Server receives the request from User #1 CSA, which in this case is a request to exchange or send contact information to User #2 (and/or #3, #4, etc). The Server sends a notification to User #2 (and/or #3, #4) alerting her of User #1's request to exchange personal contact information. This alert is sent in the form of User #1's custom social card providing personal attributes (including name and picture) and requesting User #2 to either accept, ignore or exchange contact information.

Step 3: User #2 informs the server with her choice of accepting, ignoring or exchanging contact information. This command, like the others, is processed by the CSA on the User #2 mobile device which engages in a two way communication with the Server via internet protocol.

Step 4: If the choice selected by User #2 is exchange contact information, User #2 will receive User #1's customized social card. The CSA on User #2's device obtains this information from the Server via the internet protocol. The information may be received in the form of Vcard and stored in User #2's local, mobile device resident address book as well stored under User #2's account in the Server's database. User #1 can receive User #2's customized social card in the same manner and the contact information may also be stored in User #1's local, mobile device resident address book as well as stored under User #1's account at the Server's database. If User #2's choice was "ignore", then the CSA may send, via the internet protocol a rejection notification to User #1. This may be in the form of an alternative customized social card for User #2, or simply by a text message rejection. The third choice, "accept", causes the CSA on User #2's mobile device to receive User #1's information only, but not send her card in exchange.

The communication between the Server application and CSA are conducted via common standards such as HTTP (A protocol used to request and transmit files, especially WebPages and webpage components, over the Internet or other computer network). Communication between the CSA and Server may utilize the well known XML format (A metalanguage written in SGML that allows one to design a markup language, used to allow for the easy interchange of documents over the World Wide Web)

Figure 8:
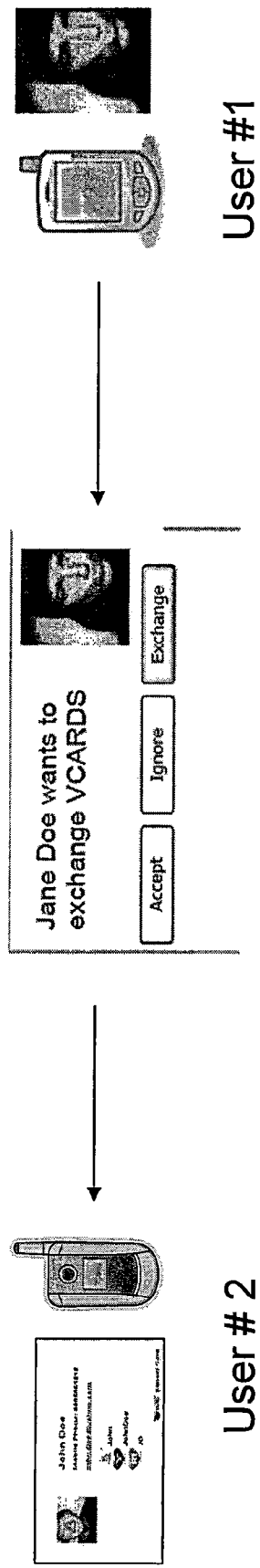
FIG. 8 describes additional aspects of notifications and responses to requests for exchange of electronics coordinates, or personal information from FIG. 7.

FIG. 8 shows a further example of notification to discovered users alerting them to an exchange request. The notification shows other user's personal attributes including name and photo.

The Server database may store any contact information exchanged and adds it through a synchronization method with the Client Application on the mobile device address book, if the user elects to store the information locally.

In other embodiments, the invention may be practiced using other short range wireless communication protocols such as WiFi or WiMax in lieu of Bluetooth if the mobile devices have chipsets that support such a wireless signal.

Associating the mobile device using Bluetooth information as described in connection with FIGS. 3, 5 and 6 may, in alternative embodiments, be accomplished with GPS (Global Positioning System) information association subject to ability to locate devices and associate them by location of cellular towers or chipsets.

The CSA, residing on the mobile device, may have the following software functionality.

An "Authentication" portion requests authentication parameters from a user (ID or user login name and password); connects to an instance of Server; sends user authorization information to the server side using ID or user name and password; displays a reason for denied access in case of incorrect login; and exits from the software in case of 4 incorrect logins; allows a user to change the password; and downloads profile information from the server.

A "Synchronize" portion retrieves a list of contacts from the server (getCard?cmd=all) and stores contents of the result set to the local address book (create contacts that don't exist and update existing contacts); periodically retrieves the list of pending and changed contacts from the server (udateCard?cmd=pending and getCard?cmd=changed) and stores contents of the result set to the local address book (create contacts that don't exist and update existing contacts); and scans the local address book for changes and new entries and sends those changes to the server.

A "Bluetooth Exchange Contacts" portion allows a user to discover devices with the application installed nearby by Bluetooth; for the devices where a client application is resident download limited information (name, title) and a picture; display the list of found Bluetooth devices with mentioning if a device from the list has a CSA running or not; allow a user to select devices from the list of found devices (one or multiple); allow a user to initiate the sending of his contact information, e.g., social card, to the selected devices; Send the user's profile to the selected device(s): If the CSA is running on the device then send the profile as profile including ID and picture; if a CSA is not installed or running on the device then send the profile as a VCARD (text/vcard MIME type); listen for inbound connections from clients; accept requests for brief information. Additionally, this module sends a partial contact information in response to a request; accepts requests for card exchange; ask a user for confirmation/send user confirmation back; accepts contact information and stores it locally; and sends own contact information.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

What I claim is:

1. A system comprising:
a server configured to communicate personal information between a first user and a second user, the first user using a respective first mobile communications device and the second user using a respective second mobile communications device each connected to a mobile telecommunications provider network and each also connected to a short range wireless communication protocol through an ad hoc wireless network;
the server in communication with the mobile telecommunications provider network, and configured to provide access to stored user profile information about the first user and the second user, respectively, including personal attribute information and a mobile communications device address;
the server configured to receive from the first mobile communications device a received unique ad hoc network identifier for the second mobile communications device received by the first mobile communications device from the second mobile communications device responsive to a search by the first mobile communications device using the short range communication protocol for the presence of the second mobile communications device on the ad hoc network;
the server configured to receive from the first mobile communications device the unique ad hoc network identifier of the second mobile communications device and to send to the second mobile communications device, using the unique ad hoc network identifier, an invitation to accept personal attribute information from, or share personal attribute information with, the first user, upon receipt of permission from the second user to receive personal attribute information about, or share personal attribute information with, the first user; and
the server configured to connect the first user and the second user through the mobile telecommunications provider network for personal communication between the first user and the second user, without the first user and the second user first connecting for personal communication through the ad hoc network wherein the server is configured to receive from the first mobile communications device the unique ad hoc network identifier for the second mobile communications device, and locate information about the second user from a social network file of the second user, including a name and image of the second user, and transmit this information to the first mobile communications device.

2. The system of claim 1, wherein the first user and the second user are registered members of a service that provides the server, wherein the server is configured to allow the first user to create a customized invitation or customized electronic card sent to the second mobile communications device.

3. The system of claim 2, wherein the customized electronic card contains contact information, a social network profile, a phone number and a photo.

4. The system of claim 1, wherein the server is configured to recognize the respective unique ad hoc network identifier of the first mobile communications device and the second mobile communications device, that is linked to a social network user account profile.

5. The system of claim 4, wherein the unique ad hoc network identifier comprises a Bluetooth device address or a WiFi address.

6. The system of claim 5, wherein the server is configured to receive the Bluetooth device address or the WiFi address over a cellular data communication connection, and associate an account profile for the second user with the address.

7. The system of claim 1, further including the server is configured to receive from the mobile communications device of the first user a plurality of respective unique ad hoc network identifiers, each for a respective one of a plurality of mobile communication devices discovered by the mobile communications device of the first user responsive to the search by the mobile communications device of the first user using the short range communication protocol, and configured to compare the unique ad hoc network identifiers to unique ad hoc network identifiers stored in a database, and configured to provide results to the first user in the form of a notification including a photo and name of each of the users associated with each of the plurality of discovered mobile communications devices.

8. The system of claim 1, wherein the server is configured to receive a respective plurality of unique ad hoc network identifiers, each for one of the plurality of mobile communication devices and to send a respective photo and name for only a portion of the plurality of unique ad hoc network identifiers for the plurality of mobile communication devices, that are identified as a member registered with a social network service.

9. The system of claim 2 wherein the server is configured to store exchanged cards in a mobile communications device phonebook and back up the stored exchanged cards on a centralized computer system in communication with a social network service provider.

10. The system of claim 1, wherein the server is configured to allow a client application communicating with the server to permit the first user to invite non-registered members of the social network service to join the social network service by entering a unique personal identifier of the non-member, including a phone number.

11. The system of claim 10, wherein the server is configured to provide an invitation to join the service using an SMS system managed by the server.

12. The system of claim 11, wherein the server is configured to conduct an initiation process by making contact with the mobile communications device and an SMS of a user to exchange contact information or join a social network group.

13. The system of claim 7, wherein the server is configured to maintain updated information in the database and to update mobile address books of users, by pushing updated information to a respective mobile communications device address book.

14. The system of claim 1, wherein the second user can elect to exchange information, reject an offer to exchange information, or to send information only or to receive information only.

15. The system of claim 1 wherein the first mobile communications device and the second mobile communications device are configured to communicate with the server through different mobile telecommunications provider networks.

16. A method comprising:
providing, via a computing device, accessible through a mobile telecommunications provider network, access to stored user profile information about a first user using a respective first mobile communications device and a second user, using a respective second mobile communications device, each also connected to a short range wireless communication protocol through an ad hoc wireless network;
receiving, via the computing device, from the first mobile communications device a received unique ad hoc network identifier for the second mobile communications device received by the first mobile communications device from the second mobile communications device responsive to a search by the first mobile communications device, for the presence of the second mobile communications device using the short range communication protocol on the ad hoc network;
sending, via the computing device, to the second mobile communications device, using the unique ad hoc network identifier, an invitation to accept personal attribute information from, or share personal attribute information with, the first user, upon receipt of permission from the second user to receive personal attribute information about, or share personal attribute information with, the first user; and
connecting, via the computing device, the first user and the second user through the mobile telecommunications provider network for personal communication between first user and the second user, without the first user and the second user first connecting for personal communications through the ad hoc network wherein the computing device is configured to receive from the first mobile communications device the unique ad hoc network identifier for the second mobile communications device, and locate information about the second user from a social network file of the second user, including a name and image of the second user, and transmit this information to the first mobile communications device.

17. The method of claim 16, wherein personal information is transferred without permission or only by permission from one or more nearby mobile communications devices, wherein the one or more nearby mobile communications devices receives a photograph and name from the first mobile communications device user and is prompted to accept, exchange or ignore an invitation to receive personal contact information with the invitation.

18. The method of claim 17, further comprising, the computing device sending an SMS text message to any of the one or more nearby mobile communications devices that are not currently members of a social network, including at least one of a URL for accessing the computing device and a download location for a client side application associated with the social network.

19. The method system of claim 17, wherein searching includes searching for Bluetooth devices permitting discovery within the ad hoc network of the mobile communications device and receiving a mobile device unique ad hoc network identifier from one or more nearby mobile communications devices includes receiving a Bluetooth address ID, and wherein the computing device associates an account profile of a user with the discovered Bluetooth address ID.

20. A non-transitory machine readable medium storing instructions that, when executed by a computing device, cause the computing device to perform a method, the method comprising:
providing through a mobile telecommunications provider network, access to stored user profile information about a first user using a respective first mobile communications device and a second user, using a respective second mobile communications device, each also connected through a short range wireless communication protocol through an ad hoc wireless network;
receiving from the first mobile communications device a received unique ad hoc network identifier for the second mobile communications device received by the first mobile communications device from the second mobile communications device responsive to a search by the first mobile communications device on the ad hoc network, for the presence of the second mobile communications device;
receiving from the first mobile communications device the unique ad hoc network identifier of the second mobile communications device and sending to the second mobile communications device, using the unique ad hoc network identifier of the second mobile communications device, an invitation to accept personal attribute information from, or share personal attribute information with, the first user, upon receipt of permission from the second user to receive personal attribute information about, or share personal attribute information with, the first user; and
connecting the first user and the second user through the mobile telecommunications provider network for personal communication between first user and the second user, without the first user and the second user first connecting for personal communications through the ad hoc network wherein the computing device is configured to receive from the first mobile communications device the unique ad hoc network identifier for the second mobile communications device, and locate information about the second user from a social network file of the second user, including a name and image of the second user, and transmit this information to the first mobile communications device.

21. The system of claim 8 wherein the server is provided by the social network service provider.

22. The system of claim 12 wherein the server is provided by the social network service provider.

23. The system of claim 1 wherein using the short range wireless communication protocol through the ad hoc wireless network comprises:
 executing an application residing on the mobile communications device of the respective first user and second user.

24. The method of claim 16 wherein using the short range wireless communication protocol through the ad hoc wireless network comprises:
 executing an application residing on the mobile communications device of the respective first user and second user.

25. The machine readable medium of claim 20 wherein using the short range wireless communication protocol through the ad hoc wireless network comprises:
 executing an application residing on the mobile communications device of the respective first user and second user.

26. The system of claim 1 wherein the first user and the second user are linked through a social network application residing on the mobile communications device of the respective first user and second user.

27. The method of claim 16 wherein the first user and the second user are linked through a social network application residing on the mobile communications device of the respective first user and second user.

28. The machine readable medium of claim 20 wherein first user and the second user are linked through a social network application residing on the mobile communications device of the respective first user and second user.

29. The system of claim 1 wherein the personal attribute information comprises at least a photograph and a name of the respective first user or second user.

30. The method of claim 16 wherein the personal attribute information comprises at least a photograph and a name of the respective first user or second user.

31. The machine readable medium of claim 20 wherein the personal attribute information comprises at least a photograph and a name of the respective first user or second user.

* * * * *